United States Patent
Ohsaku et al.

Patent Number: 5,987,367
Date of Patent: Nov. 16, 1999

[54] VEHICLE SPRUNG- AND UNSPRUNG-STRUCTURE RELATIVE-VELOCITY COMPUTING APPARATUS

[75] Inventors: Satoru Ohsaku; Yoshikazu Motozono, both of Toyota; Hideo Nakai, Owariasahi, all of Japan

[73] Assignee: Toyota Jidosha Kabushiki Kaisha, Toyota, Japan

[21] Appl. No.: 08/855,823

[22] Filed: May 12, 1997

[30] Foreign Application Priority Data

May 22, 1996 [JP] Japan .................................. 8-127563

[51] Int. Cl.⁶ .................................................. B60G 17/015
[52] U.S. Cl. ............................ 701/37; 701/38; 280/5.515
[58] Field of Search ...................... 701/37, 38; 280/5.515, 280/5.5; 188/266.4, 266.2

[56] References Cited

U.S. PATENT DOCUMENTS

| | | | |
|---|---|---|---|
| 5,269,558 | 12/1993 | Yoshioka et al. | 188/266.4 |
| 5,467,280 | 11/1995 | Kimura | 701/37 |
| 5,642,899 | 7/1997 | Inoue et al. | 280/5.515 |
| 5,832,398 | 11/1998 | Sasaki et al. | 701/37 |

FOREIGN PATENT DOCUMENTS

| | | |
|---|---|---|
| 36 40 152 | 11/1988 | Germany . |
| 42 02 091 | 8/1992 | Germany . |
| 44 30 364 | 2/1996 | Germany . |
| 195 40 161 | 5/1996 | Germany . |
| 06106937 | 4/1994 | Japan . |
| 6-106937 | 4/1994 | Japan . |
| 42 16 374 | 11/1992 | United Kingdom . |

*Primary Examiner*—Tan Nguyen
*Attorney, Agent, or Firm*—Kenyon & Kenyon

[57] ABSTRACT

Acceleration detecting sensor (60) is provided in a sprung structure (50), while a vibration model comprising the sprung mass of a vehicle, the spring, and the shock absorber is previously stored in control unit (58). The deviation of the detected acceleration from the estimated vertical acceleration of the sprung structure is computed by a control unit (58) and then amplified. The vertical acceleration of the sprung structure and the relative velocity between sprung and unsprung structures are estimated by a control unit (58) according to the amplified deviation and the vibration model. The stored vibration model has one degree of freedom and a simple structure.

6 Claims, 8 Drawing Sheets

VEHICLE SPRUNG- AND UNSPRUNG-STRUCTURE RELATIVE-VELOCITY COMPUTING APPARATUS

BACKGROUND OF THE INVENTION (i) Field of the Invention

The present invention relates to an apparatus for computing the relative velocity between sprung and unsprung structures in a vehicle connected through a shock absorber and a spring.

(ii) Description of the Related Art

A suspension of a vehicle is a system for connecting a sprung structure, such as a chassis, with an unsprung structure such as a wheel, which supports the sprung structure and greatly influences vibration, ride comfort, and maneuvering stability. The suspension includes such parts as a spring for moderating a shock from the surface of a road and a shock absorber for damping the free vibration of the spring and controlling the velocity of an attitude vary of a vehicle. As described above, the suspension has various requirements. However, these performances frequently conflict with each other. Therefore, in the case of design, it is desirable to find a certain compromising point by considering the balance between these performances.

In order to achieve the suspension's requirements to a high degree, an art is known which makes it possible to vary the characteristics of a suspension. For example, there is an art for varying damping forces of a shock absorber according to the state of a vehicle. In this example, a damping force is increased so as to early converge the free vibration of a spring system in the region of the resonance frequency of a sprung structure and the region of the resonance frequency of an unsprung structure and the damping force is decreased in regions other than the above regions so as to greatly absorb by the suspension the input from the road surface.

To control the above variable damping-force suspension and to analyze movement of the suspension, an apparatus for estimating the position and velocity of the suspension and parameters serving as other physical values has been proposed. For example, in Japanese Patent Laid-Open Publication No. Hei 6-106937, a suspension having a variable damping-force shock absorber is controlled by estimating a certain parameter showing the vertical velocity of a sprung structure and assuming that the damping force of the shock absorber is generated proportionally to the parameter. Moreover, according to the art disclosed in the official gazette, a single-wheel model with two degrees of freedom is used to estimate the parameter. That is to say, the model is used in which a sprung structure and an unsprung structure having a limited mass are connected each other by a spring and a shock absorber to input an external force from the unsprung structure through the spring element of a wheel.

However, when estimating a vibration having a frequency component close to the resonance frequency of a sprung structure, it is possible to ignore the motion of an unsprung structure because the amplitude of the unsprung structure is significantly small compared to that of the sprung structure. That is to say, it is possible to use a model with one degree of freedom instead of the above model with two degrees of freedom. In other words, the above-described conventional estimating apparatus uses an excessively large model in order to analyze a point nearby the resonance point of a sprung structure and it therefore has a problem that the operation load increases.

SUMMARY OF THE INVENTION

The present invention is developed to solve the above problem, and its object is to provide an apparatus whose operation load is decreased by estimating a parameter such as a relative velocity between sprung and unsprung structures with a small operation model.

A sprung- and unsprung-structure relative-velocity computing apparatus of the present invention computes the relative velocity between sprung and unsprung structures of a vehicle connected through a shock absorber and a spring, and it has the following characteristic structures.

Acceleration detecting means detects vertical acceleration of a sprung structure and deviation detecting means detects deviation of the detected vertical acceleration from the estimated vertical acceleration of the sprung structure. Moreover, the deviation of the detected vertical acceleration from the estimated vertical acceleration is amplified by deviation amplifying means at a predetermined magnification. Vibration model storing means stores a vibration model comprising the sprung mass of a vehicle, the spring, and the shock absorber. Moreover, vibration analyzing means estimates the vertical acceleration of the sprung structure and the relative velocity between sprung and unsprung structures in accordance with the amplified deviation.

Moreover, it is possible to use a structure in which a pressure detecting means for detecting the pressure of the fluid in a variable damping-force shock absorber capable of varying damping forces is included and vibration analyzing means performs estimating operation by also using the pressure of the fluid in addition to the amplified deviation.

Furthermore, it is possible to use a structure in which the vibration analyzing means performs an estimating operation by using a valve-opening-degree command from a control means of the valve opening degree of a variable damping-force shock absorber capable of varying damping forces as an input for the vibration analyzing means and also using the valve-opening-degree command value in addition to the amplified deviation.

DETAILED DESCRIPTION OF THE PREFERRED EMBODIMENTS

Figure 1:
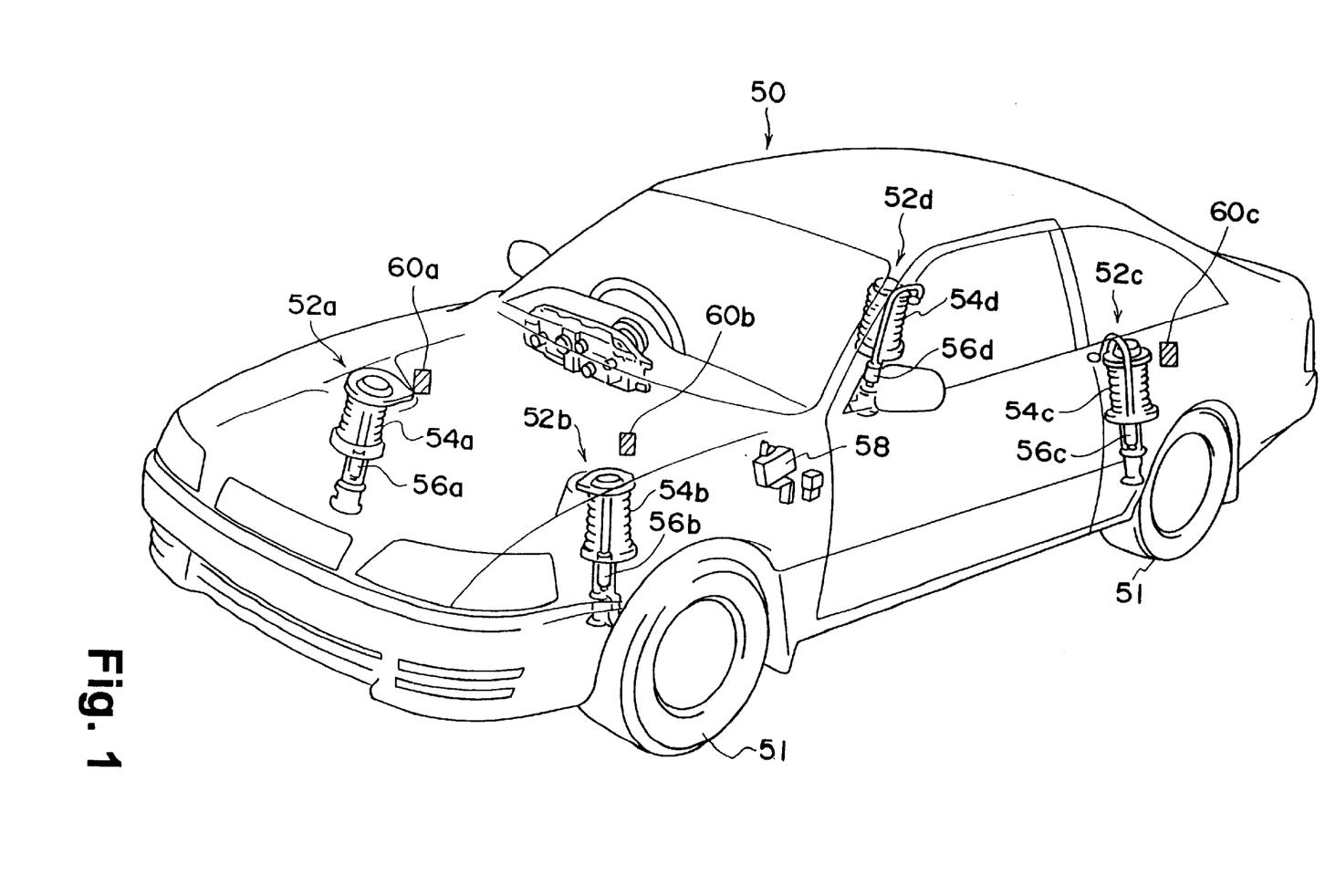
FIG. 1 is an illustration showing the layout of portions of a vehicle's suspension.

The preferred embodiments of the present invention will be described below by referring to the accompanying drawings. FIG. 1 is an illustration showing the layout portions of a vehicle provided with a variable damping-force shock absorber. A chassis 50 serving as a sprung structure is connected with wheels 51 serving as unsprung structures by suspensions including shock absorbing systems 52a, 52b, 52c and 52d. (hereafter, these four shock absorbing systems are collectively described using symbol 52). The shock absorbing systems 52 further include springs 54a, 54b, 54c and 54d, and shock absorbers 56a, 56b, 56c and 56d. (hereafter, these four springs and four shock absorbers are collectively described with respective symbols 54 and 56).

Figure 2:
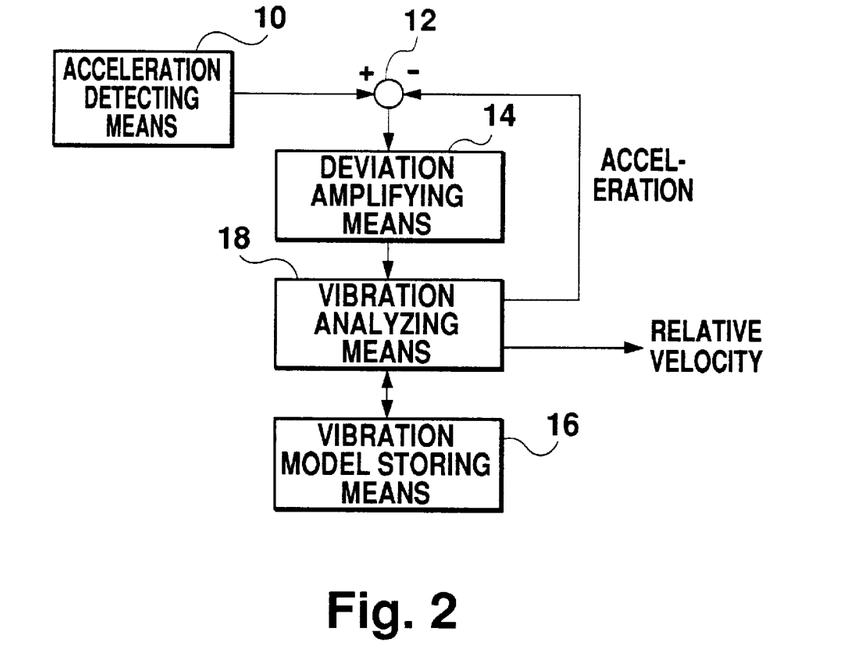
FIG. 2 is a structural block diagram of an embodiment of the present invention.

FIG. 2 shows the structure of an embodiment of a sprung-and unsprung-structure relative-velocity computing apparatus. Acceleration detecting means 10 detects the vertical acceleration of a sprung structure and deviation detecting means 12 computes the deviation of the vertical acceleration of the sprung structure from the estimated vertical acceleration of the sprung structure. Moreover, the deviation of the detected acceleration from the estimated acceleration is amplified by deviation amplifying means 14 at a predetermined magnification. Vibration model storing means 16 stores a vibration model comprising the sprung mass of a vehicle, the spring, and the shock absorber. Furthermore, vibration analyzing means 18 estimates the acceleration of the sprung structure and the relative velocity between sprung and unsprung structures in accordance with the amplified deviation.

According to the above structure, the vibration model is simplified because the model comprises the sprung mass, spring, and shock absorber and thereby, the operation load is decreased. Moreover, because unsprung data is excluded, the estimation accuracy is not deteriorated due to measurement errors or variation in unsprung data over time. Furthermore, because operations are performed by a model of only a sprung structure with a relatively large mass and a low resonance frequency, the sensitivity for the input of a high frequency is lowered and a structure barely influenced by noise can be obtained.

A method of computing the relative velocity between sprung and unsprung structures of this embodiment will be described in detail.

Figure 3:
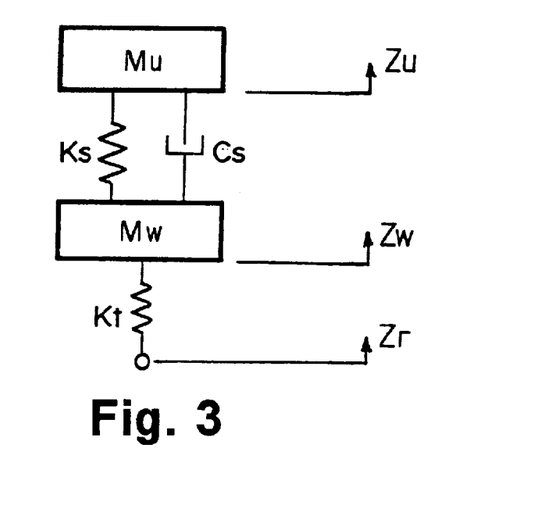
FIG. 3 is an analysis model with two degrees of freedom for vibration of a vehicle.

FIG. 3 shows a single-wheel model including a shock absorber. In FIG. 3, Mu denotes the mass of a sprung structure (hereafter referred to as sprung mass) and Mw denotes the mass of an unsprung structure (hereafter referred to as unsprung mass). The masses of the arm constituting a suspension, spring 54, and shock absorber 56 are distributed to the sprung and the unsprung structures in a proper ratio. Ks denotes the spring constant of the spring 54, Kt denotes the spring constant of a tire, and Cs denotes the damping coefficient of the shock absorber 56. Moreover, Zu denotes the vertical displacement of a sprung structure, Zw denotes the vertical displacement of an unsprung structure, and Zr denotes the displacement of the surface of a road.

Furthermore, in the subsequent description, a symbol ' denotes the time differentiation of a variable provided with the symbol ' and '' denotes two-times time differentiation.

Therefore, Zu' denotes the vertical velocity of a sprung structure and Zu'' denotes the vertical acceleration of the sprung structure. Furthermore, a symbol $^T$ denotes the transposed matrix of a matrix provided with $^T$.

The motion equations of the system in FIG. 3 can be represented as follows:

$$Zu'' = \frac{-Ks}{Mu}Zu + \frac{-Cs}{Mu}Zu' + \frac{Ks}{Mu}Zw + \frac{Cs}{Mu}Zw' \quad (1)$$

$$Zw'' = \frac{-(Ks+Kt)}{Mw}Zw + \frac{-Cs}{Mw}Zw' + \frac{Ks}{Mw}Zu + \frac{Cs}{Mw}Zu' + \frac{Kt}{Mw}Zr \quad (2)$$

In the case of a general vehicle, the resonance frequency of a sprung structure is approx. 1 Hz and that of an unsprung structure is approx. 10 Hz, that is to say, frequencies differ by an order of 10. Therefore, it is possible to use the singularly perturbed concept used for the control theory. That is to say, by assuming Zw' as 0 and Zw'' as 0, the equations (1) and (2) can be modified into the following equations (3) and (4).

$$Zuh'' = \frac{-Ks}{Mu}Zuh + \frac{-Cs}{Mu}Zuh' \quad (3)$$

The equation (3) is converted into a state space equation as shown below.

$$X_c' = A_c \cdot X_c + G_c w \quad (4)$$

wherein
 $X_c = (Zuh'\ Zuh)^T$,
 w is an imaginary disturbance, and
 $G_c$ is a two-row one-column coefficient matrix.

Moreover, because a measurable signal shows the vertical acceleration of a single sprung structure, the following equation (5) is used as an output equation.

$$y_1 = C_{c1} \cdot X_c + v \quad (5)$$

wherein
 $Y_1$ is an estimated vertical acceleration of sprung structure, $$C_{c1} = \left( \frac{-Ks}{Mu}\ \frac{-Cs}{Mu} \right),$$

v is an measurement noise.

Moreover, the output equation for computing the above relative velocity from a parameter is defined as the following equation (6).

$$y_2 = C_{c2} \cdot X_c \quad (6)$$

wherein
 $Y_2$ is an estimated relative velocity, and
 $C_{c2} = (-1\ 0)$

Furthermore, when showing the state equation (4) of the above plant and the output equations (5) and (6) in the form of discrete systems, the following equations (7), (8) and (9) are obtained.

$$x(k+1) = A \cdot x(k) + G \cdot w(k) \quad (7)$$

$$y_1(k) = C_1 \cdot x(k) + v(k) \tag{8}$$

$$y_2(k) = C_2 \cdot x(k) \tag{9}$$

Then, the equation of the state observer for the above plant for estimating the above relative velocity is defined as shown below.

$$\left. \begin{array}{l} z(k+1) = A \cdot \hat{z}(k) \\ \hat{z}(k) = z(k) + L(y_1(k) - C_1 \cdot z(k)) \end{array} \right\} \tag{10}$$

$$y_{2h}(k) = C s_2 \cdot z(k) \tag{11}$$

Figure 4:
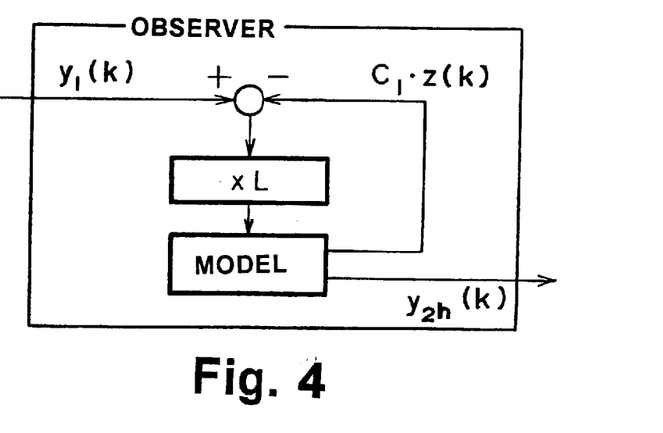
FIG. 4 is a block diagram showing a structure of the observer of the present embodiment.

In this case, L denotes the gain of a stationary Kalman filter which can be obtained by solving a Riccati's equation, z(k) denotes the estimated value of x(k) computed by a state observer, and $y_{2h}(k)$ denotes the estimated value of the relative velocity between sprung and unsprung structures $y_2(k)$. FIG. 4 shows a structural block diagram of the state observer.

In order to obtain the estimated value $y_{2h}(k)$ of the relative velocity between sprung and unsprung structures by using the state observer, it is necessary to obtain fixed coefficient matrixes A, $C_1$ and $C_2$ depending on a plant and the output $y_1(k)$ showing the acceleration of a sprung structure. Among these values, the coefficient matrixes can easily be obtained from the above sprung mass and sprint constant and the output $y_1(k)$ can be obtained from an acceleration sensor. Therefore, it is possible to estimate the relative velocity between sprung and unsprung structures.

Next, there will be described an embodiment in the case that it is considered that the shock absorber 56 shown in FIG. 2 is the variable damping-force type. The variable damping-force force shock absorber 56 generates a damping force by a resistance generated when the fluid sealed in the shock absorber 56 passes through an orifice. This embodiment makes it possible to adjust a damping force by controlling a valve opening degree and thereby changing the fluid channel area of the orifice. That is to say, when the valve opening degree and the fluid channel area are large, the damping force decreases because the fluid smoothly passes through the orifice. And, when the valve opening degree is small, the damping force increases because the resistance of the fluid increases. The valve opening degree can be varied by an actuator provided in a shock absorber and the valve opening degree is controlled in accordance with a command sent from a control unit 58. Moreover, the control unit 58 computes the relative velocity between the chassis 50 and the wheels 51 from the vertical acceleration of the chassis detected by acceleration sensors 60a, 60b and 60c in accordance with the arithmetic processing to be described later and outputs an instruction to the actuator in accordance with the relative velocity.

Figure 5:
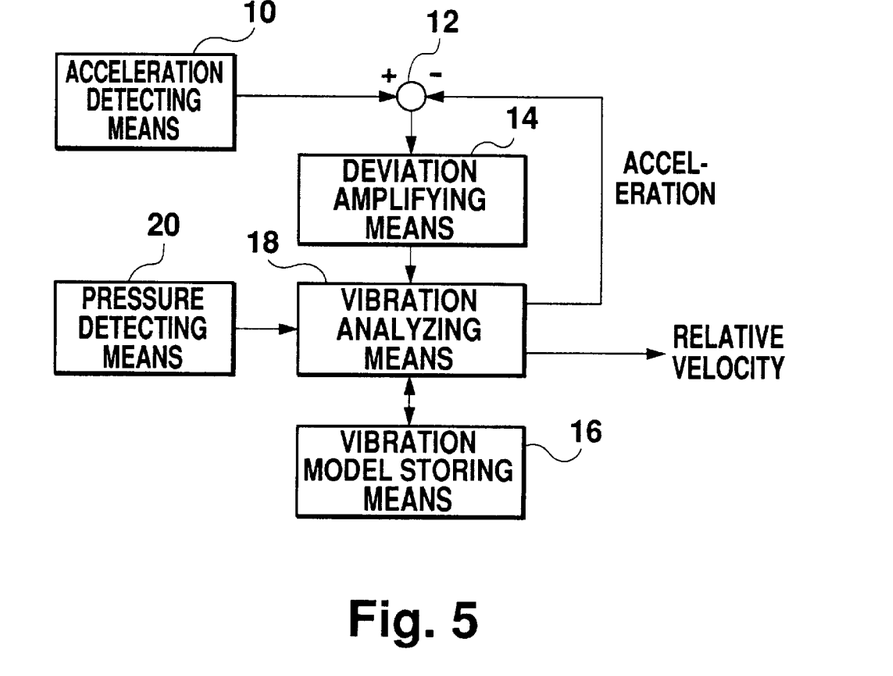
FIG. 5 is a structural block diagram of a structure of another embodiment of the present invention.

FIG. 5 shows the structure of the sprung- and unsprung-structure relative-velocity computing apparatus of this embodiment. This embodiment is constituted so that the structure in FIG. 2 is further provided with pressure detecting means 20 for detecting the pressure of the working fluid in a variable damping-force shock absorber capable of varying damping forces and the vibration analyzing means 18 performs estimating operation by using not only the amplified deviation but also the pressure of the fluid as inputs.

Next, a method for computing the relative velocity between sprung and unsprung structures of this embodiment will be described in detail.

Figure 6:
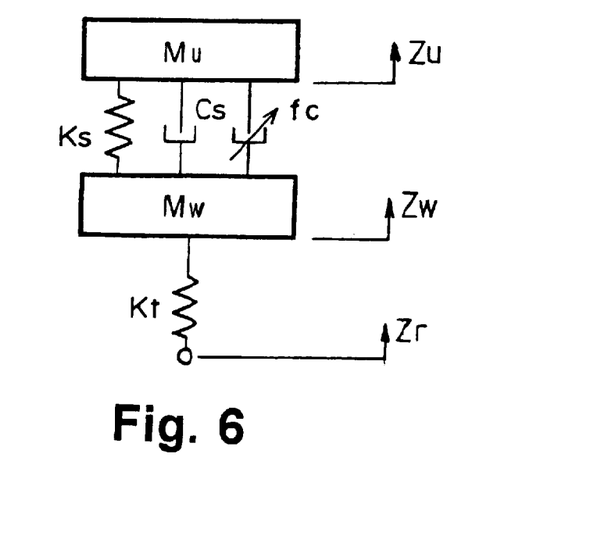
FIG. 6 is an analysis model with two degrees of freedom for vibration of a vehicle, particularly an analysis model of a vehicle provided with a damping-force-variable absorber.

When applying a single-wheel model to a vehicle having a variable damping-force shock absorber, it is necessary to consider a variable damping coefficient fc parallel with the sprint constant Ks and damping coefficient Cs as shown in FIG. 6. When showing a state equation and an output equation by using a variable damping force u generated by the variable damping coefficient fc, the following equations (12) and (13) are obtained.

$$x_c = A_c \cdot x_c + B_c \cdot u + G_c \cdot w \tag{12}$$

$$y_1 = C_{c1} \cdot x_c + D_{c1} \cdot u + v \tag{13}$$

wherein each of $B_c$ and $B_{c1}$ is a coefficient matrix.

These equations are obtained by further adding a term related to the variable damping force u to the state equations (4) and (5). Moreover, a state observer is defined by the following equations (14) and (15).

$$\begin{cases} z(k+1) = A \cdot \hat{z}(k) + B \cdot u(k) \\ \hat{z}(k) = z(k) + L\{y_1(k) - C_1 \cdot z(k) - D_1 \cdot u(k)\} \end{cases} \tag{14}$$

$$y_{2h}(k) = C_2 \cdot z(k) + D_2 \cdot u(k) \tag{15}$$

Figure 7:
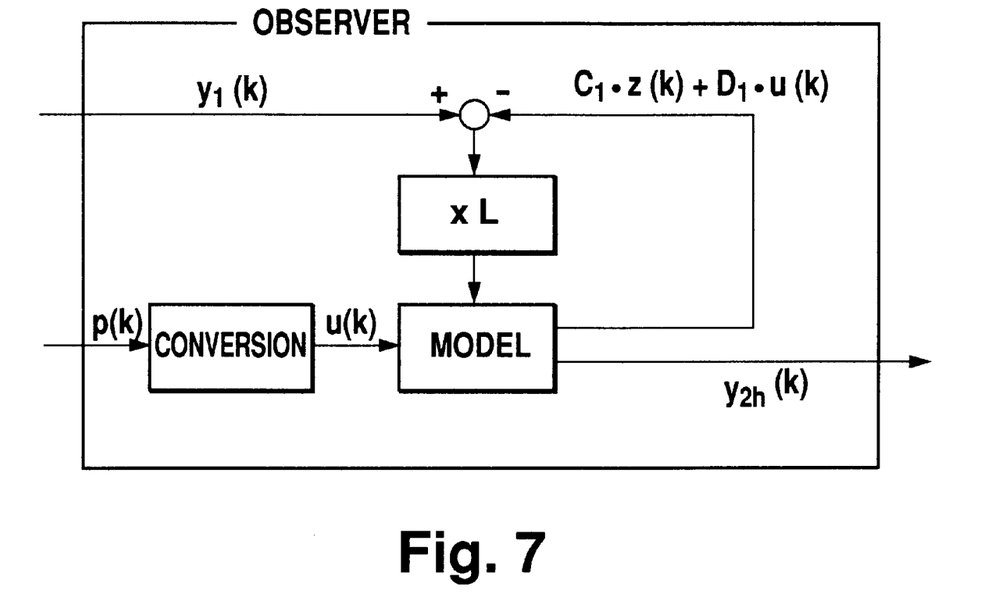
FIG. 7 is a block diagram showing another structure of the observer of the present embodiment.

In order to obtain the estimated value $y_{2h}(k)$ of the relative velocity between sprung and unsprung structures by using the state observer, it is necessary to obtain fixed coefficient matrixes A, B, $C_1$, $C_2$, $D_1$ and $D_2$ depending on a plant, output $y_1(k)$ showing the acceleration of a sprung structure, and input u(k) showing a damping force. Among these values, the coefficient matrixes can easily be obtained from the above sprung mass and spring constant and the output $y_1(k)$ can be obtained from an acceleration sensor. The input u(k) can be converted from the pressure p(k) of the fluid of a shock absorber. Therefore, a pressure sensor for detecting the pressure of fluid is used. The structure of a state observer in the above case is shown in FIG. 7. Thus, it is possible to estimate the relative velocity between sprung and unsprung structures.

Figure 8:
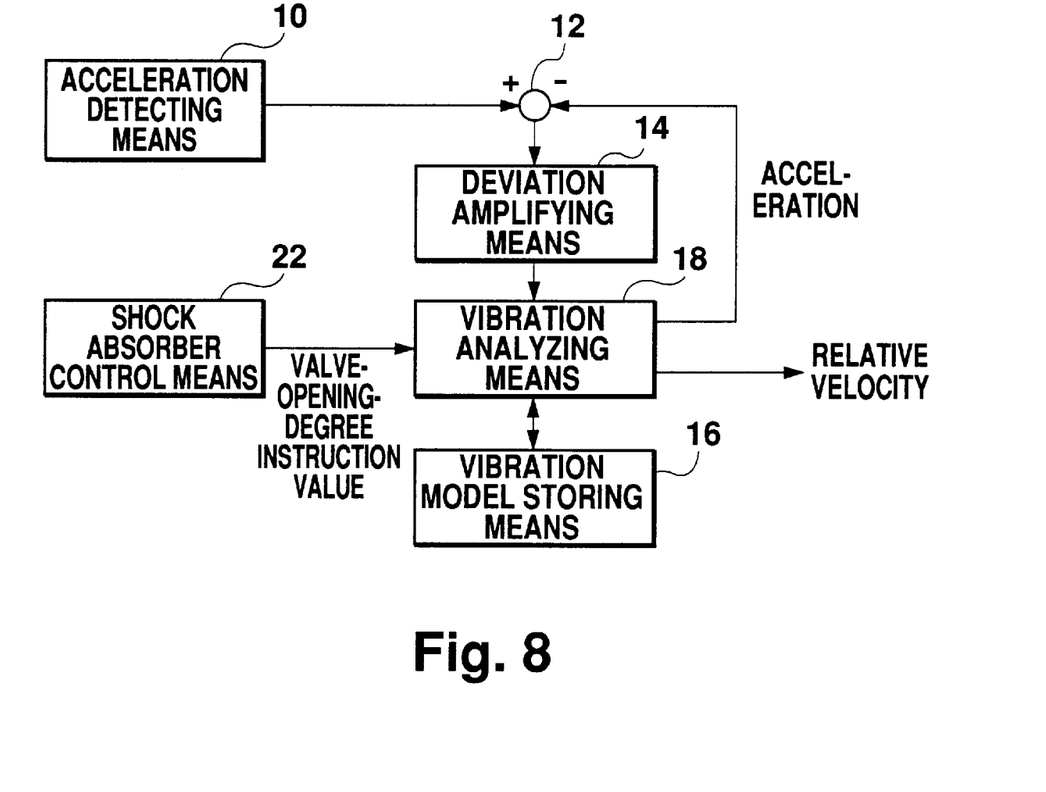
FIG. 8 is a structural block diagram of a structure of a further embodiment of the present invention.

Moreover, it is possible to compute a damping force by previously measuring the damping force using the valve opening degree and relative velocity in a shock absorber as variables and using the command value c(k) of the valve opening degree and the estimated relative velocity $Y_{2h}(k)$. FIG. 8 shows the structure of the sprung- and unsprung-structure relative-velocity computing apparatus in the above case. The present invention is constituted so that a valve-opening-degree command value from valve opening degree control means 22 of a variable damping-force shock absorber capable of varying damping forces is further used as the input for the vibration analyzing means 18 in addition to the structure in FIG. 2. The vibration analyzing means 18 performs estimating operation by using the valve-opening-degree command value as an input in addition to the amplified deviation.

Figure 9:
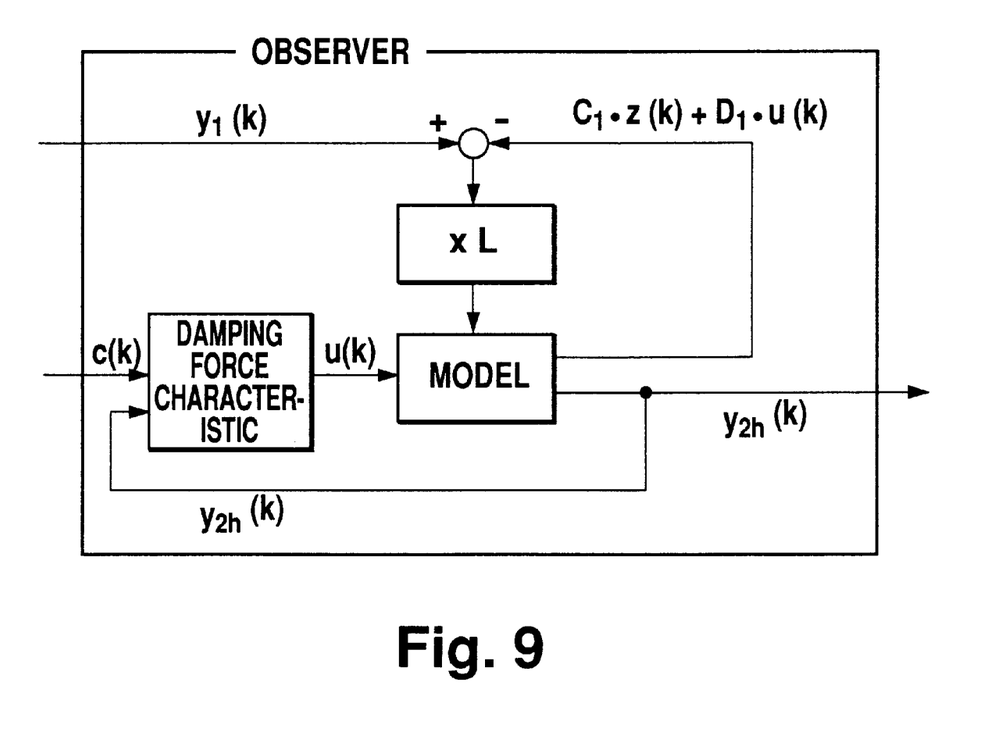
FIG. 9 is a block diagram showing yet another structure of the observer of the present embodiment.

Moreover, the observer structure in the above case is shown in FIG. 9. It is possible to estimate the relative velocity between sprung and unsprung structures using this structure.

Thus, by providing a structure capable of estimating the damping force of a suspension using a variable damping-force shock absorber for the suspension, it is possible to compute the relative velocity between sprung and unsprung structures to be greatly influenced by a damping force. The apparatus shown in FIG. 5 estimates a damping force from the pressure of the fluid of a shock absorber. Moreover, the apparatus shown in FIG. 8 estimates a damping force from the command value of the valve opening degree of the orifice provided for the fluid channel of a shock absorber.

Furthermore, although z(k), which is the estimated value of a parameter x(k), is used in the above observer equations (11) and (15), it is also possible to use the estimated value z(k+1) of a parameter one computation cycle after. That is to say, these equations can be rewritten as the following equations (16) and (17).

$$y_{2h}(k) = C_2 \cdot z(k+1) \quad (16)$$

$$y_{2h}(k) = C_2 \cdot z(k+1) + D_2 \cdot u(k) \quad (17)$$

The estimated value z(k+1) of the parameter is already obtained by another observer equations (10) and (14), it is also possible to obtain the relative velocity between sprung and unsprung structures by the above equations (11) and (15). Thus, by using a parameter one computation cycle after, it is possible to correct an estimation delay due to a computation cycle. Moreover, in the case of the above correction, the estimated value z(k+1) is an already obtained value as described above. Therefore, the computational quantity is not increased.

Figure 10:
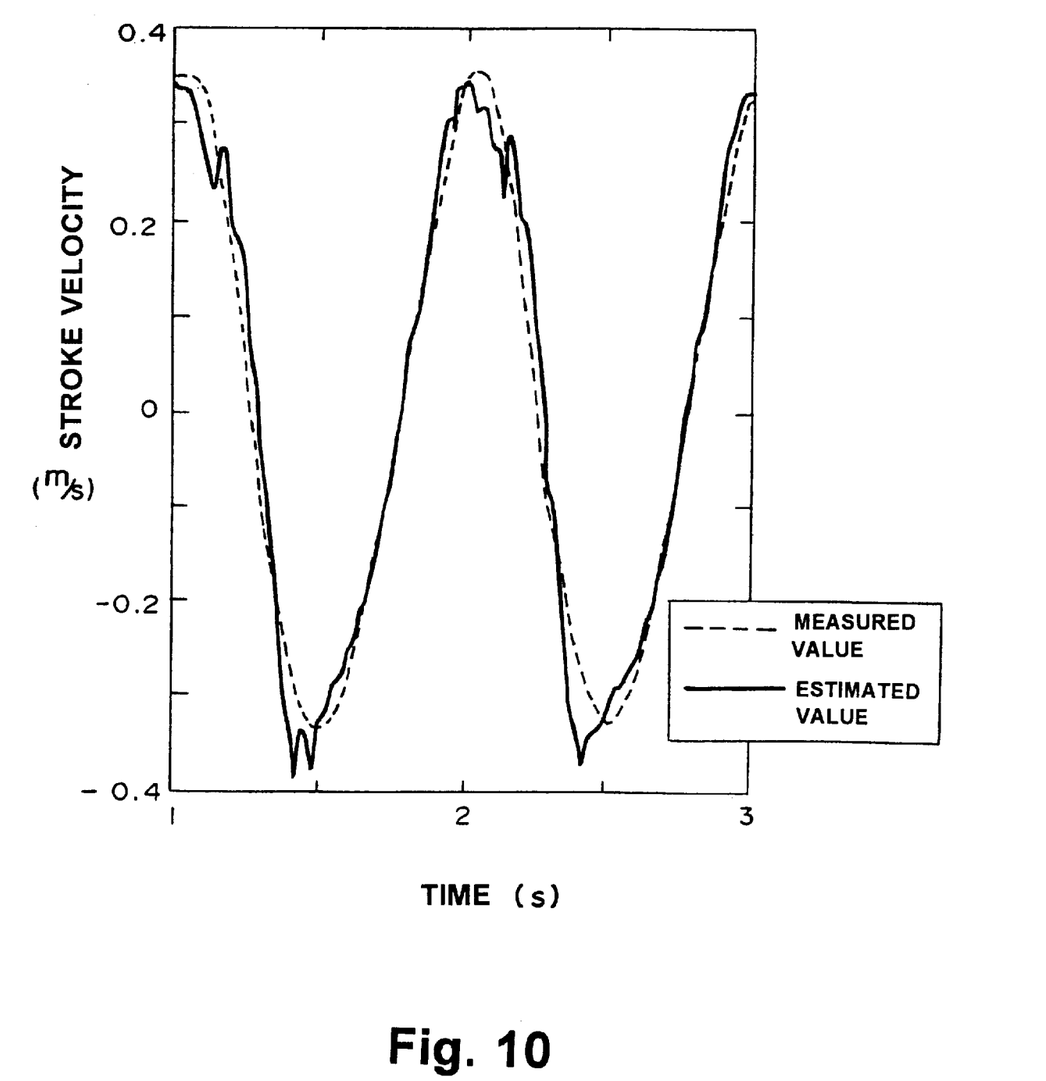
FIG. 10 is an illustration showing the comparison between estimated value and measured value of vibration of a vehicle provided with a damping-force-variable shock absorber.

FIG. 10 shows responses when vibrating a vehicle provided with a variable damping-force shock absorber. The vibration is performed by using sine-wave inputs with an amplitude of 10 mm and a frequency of 1 Hz and the time variation of the stroke velocity of a suspension is shown. The measured value is shown by a broken line and the estimated value is shown by a continuous line. Because the stroke velocity of the suspension is the relative velocity between sprung and unsprung structures of a vehicle, it is found that a relative velocity can be estimated at a high accuracy under the above vibrating conditions.

Figure 11:
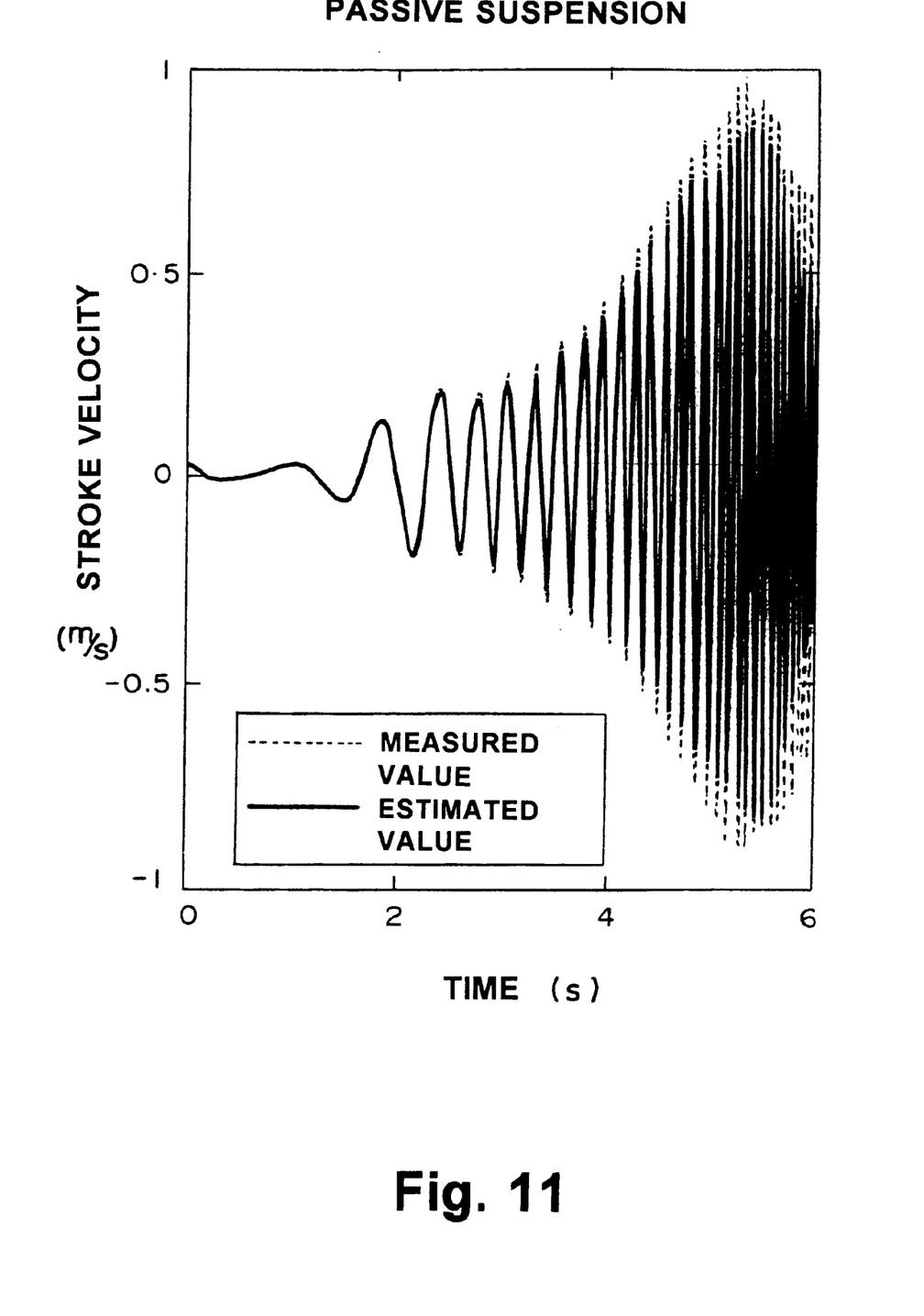
FIG. 11 is an illustration showing the comparison between estimated value and measured value for vibration of a vehicle provided with a shock absorber whose damping force cannot be adjusted.

Moreover, FIG. 11 shows responses when vibrating a vehicle provided with a normal shock absorber whose damping force cannot be adjusted. The vibration is performed by using sine-wave inputs with an amplitude of 10 mm and a frequency of 0.5 to 5 Hz and the time variation of the stroke velocity of a suspension is shown. Moreover, the measured value is shown by a broken line and the estimated value is shown by a continuous line. It is found that a relative velocity can be estimated at a high accuracy under the above vibrating conditions even when a damping force cannot be adjusted.

Figure 12:
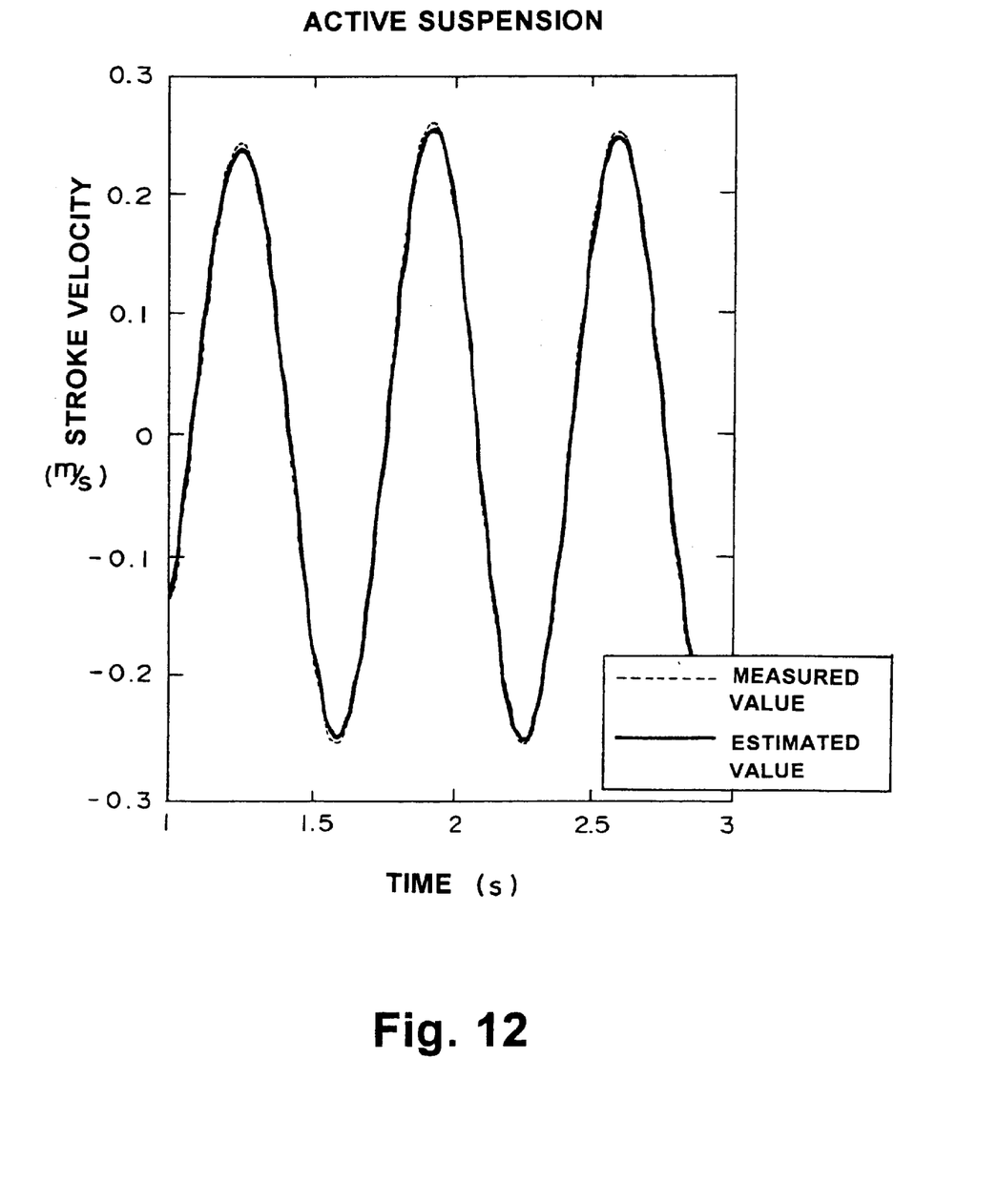
FIG. 12 is an illustration showing the comparison between estimated value and measured value for vibration of a vehicle provided with an active suspension having a hydraulic actuator.

Furthermore, FIG. 12 shows responses when vibrating a vehicle provided with a so-called active suspension whose stroke can actively be adjusted by an actuator. The vibration is performed using sine-wave inputs with an amplitude of 10 mm and a frequency of 1 Hz and the time variation of the stroke velocity of the suspension is shown. The measured value is shown by a broken line and the estimated value is shown by a continuous line. It is found that a relative velocity can be very accurately estimated under the above conditions, even for a vehicle provided with an active suspension. Particularly, because the actuator used for the active suspension has a follow-up property of only up to several Hz, it is impossible to control approx. 10 Hz which is the resonance frequency of an unsprung structure. Therefore, it is unnecessary to handle the actuator as a model with two degrees of freedom considering unsprung control and it is possible to obtain a high accuracy from a model with one degree of freedom.

According to each of the above embodiments, the structure of a model used for a state observer is simplified. Therefore, the circuit structure of the state observer is simplified and the operation load is also decreased. Moreover, because unsprung data is excluded, it is possible to prevent deterioration of estimation accuracy due to estimated error or variation in unsprung data over time. Moreover, because the sensitivity in a high-frequency region is lowered, little disturbance such as noise is included.

What is claimed is:

1. A sprung and unsprung-structure relative-velocity computing apparatus for computing the relative velocity between sprung and unsprung structures of a vehicle connected through a shock absorber and a spring comprising:

an acceleration detecting means for detecting a vertical acceleration of a vehicle's sprung structure;

a vibration model storing means for storing a vibration model provided with a sprung mass, spring, and shock absorber of the vehicle;

a vibration analyzing means for computing a vertical acceleration of the sprung structure and the relative velocity between the sprung and unsprung structures;

a deviation computing means for computing a deviation of the detected vertical acceleration from the estimated vertical acceleration of the sprung structure; and an amplifying means for amplifying the deviation;

wherein said computed vertical acceleration is based on the stored vibration model and the amplified deviation.

2. The sprung and unsprung-structure relative-velocity computing apparatus according to claim 1, wherein said shock absorber is a variable damping-force shock absorber capable of varying damping forces which includes pressure detecting means for detecting a fluid pressure in the shock absorber, and said vibration analyzing means performs computations according to the amplified computed deviation and the fluid pressure.

3. The sprung and unsprung-structure relative-velocity computing apparatus according to claim 1, wherein said shock absorber is a variable damping-force shock absorber capable of varying damping forces by adjusting a valve opening degree of an orifice provided for a fluid channel of the shock absorber which includes control means for outputting a valve-opening-degree command value for adjusting said valve opening degree, and said vibration analyzing means performs computations in accordance with said amplified computed deviation and the valve-opening-degree command value.

4. A method for computing the relative velocity between sprung and unsprung structures of a vehicle connected through a shock absorber and a spring comprising the steps of:

detecting a vertical acceleration of a vehicle's sprung structure;

storing a vibration model provided with a sprung mass, spring, and shock absorber of the vehicle;

computing a vertical acceleration of the sprung structure and the relative velocity between the sprung and unsprung structures with a vibration analyzing means;

computing a deviation of the detected vertical acceleration from the estimated vertical acceleration of the sprung structure; and amplifying the deviation;

wherein said computed vertical acceleration is based on the stored vibration model and the amplified deviation.

5. The method according to claim 4, wherein said shock absorber is a variable damping-force shock absorber capable of varying damping forces which includes pressure detecting means for detecting a fluid pressure in the shock absorber, and said vibration analyzing means performs computations according to the amplified computed deviation and the fluid pressure.

6. The method according to claim 4, wherein said shock absorber is a variable damping-force shock absorber capable of varying damping forces by adjusting a valve opening degree of an orifice provided for a fluid channel of the shock absorber which includes control means for outputting a valve-opening-degree command value for adjusting said valve opening degree, and said vibration analyzing means performs computations in accordance with said amplified computed deviation and the valve-opening-degree command value.

* * * * *

UNITED STATES PATENT AND TRADEMARK OFFICE
CERTIFICATE OF CORRECTION

PATENT NO. : 5,987,367
DATED : 16 November 1999
INVENTOR(S) : Satoru OHSAKU et al.

It is certified that error appears in the above-identified patent and that said Letters Patent is hereby corrected as shown below:

| Column | Line | |
|---|---|---|
| 4 | 46 | Change "$Y_1$" to --$y_1$--. |
| 4 | 49 | After the equation, insert --and--. |
| 4 | 60 | Change "$Y_2$" to --$y_2$--. |
| 5 | 33 | Change "force" (second occurrence). |

Signed and Sealed this

Seventeenth Day of April, 2001

Attest:

Attesting Officer

NICHOLAS P. GODICI

Acting Director of the United States Patent and Trademark Office